(12) United States Patent
Desai (10) Patent No.: US 11,275,691 B2
(45) Date of Patent: Mar. 15, 2022

(54) INTELLIGENT CONTROL OF CACHE

(71) Applicant: EMC IP Holding Company LLC, Hopkinton, MA (US)

(72) Inventor: Keyur Desai, Cary, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/381,105

(22) Filed: Apr. 11, 2019

(65) Prior Publication Data

US 2020/0327060 A1    Oct. 15, 2020

(51) Int. Cl.
*G06F 12/0862*    (2016.01)

(52) U.S. Cl.
CPC .. *G06F 12/0862* (2013.01); *G06F 2212/6026* (2013.01)

(58) Field of Classification Search
CPC .............. G06F 12/0862; G06F 2212/6026
USPC ........................................... 711/137
See application file for complete search history.

(56) References Cited

U.S. PATENT DOCUMENTS

| 7,571,221 | B2* | 8/2009 | Rao ................. | H04L 29/06 709/220 |
| 9,189,308 | B2* | 11/2015 | Young ............... | G06F 11/0721 |
| 2005/0235125 | A1* | 10/2005 | Accapadi ........... | G06F 12/023 711/170 |
| 2007/0106849 | A1* | 5/2007 | Moore ............... | G06F 16/172 711/137 |
| 2012/0054449 | A1* | 3/2012 | Hu .................... | G06F 12/0862 711/137 |
| 2015/0212943 | A1* | 7/2015 | Yang ................. | G06F 12/0862 711/137 |

\* cited by examiner

*Primary Examiner* — Gautam Sain
(74) *Attorney, Agent, or Firm* — Womble Bond Dickinson (US) LLP (57) ABSTRACT

A method and system for intelligent control of read-ahead cache for a client application is provided. The method receives an application profile of the client application, the application profile indicating thresholds for determining a plurality of access patterns of the client application. The method also determines a current access pattern of the client application based on the thresholds and a historical access pattern of the client application. The current access pattern and the historical access pattern are one of the plurality of access patterns. The method further dynamically enables and disables read-ahead cache for the client application based on a transition between the historical access pattern and the current access pattern.

20 Claims, 4 Drawing Sheets

INTELLIGENT CONTROL OF CACHE

TECHNOLOGICAL FIELD

The present disclosure relates generally to intelligent control of cache, and in particular, to intelligent control of cache based on access pattern detection.

BACKGROUND

Many systems do not provide intelligent control of read-ahead cache, which may cause that more data are read than needed or required. For example, in many systems, the disabling and enabling of read-ahead cache may not be driven by any threshold or access pattern detection, which may result in an aggressive enablement of read-ahead cache that may lower the efficiency of utilizing read-ahead cache. In other words, read-ahead cache may be enabled when it is not needed. The aggressive enablement of read-ahead cache may also cause random reading operations being treated as sequential reading operations and may override all optimizations for random reading operations.

Therefore, it would be desirable to have a system and method that takes into account at least some of the issues discussed above, as well as other possible issues.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Example implementations of the present disclosure are directed to intelligent control of cache based on access pattern detection. Example implementations can determine a current access pattern of the client application. Based on a transition between a historical access pattern of the client application and the current access pattern, example implementations can dynamically enable and disable read-ahead cache for the client application. Example implementations can enable read-ahead cache for the client application when read-ahead cache is needed and can disable read-ahead cache for the client application when read-ahead cache is not needed. Thus, example implementations can avoid an aggressive enablement of read-ahead cache. Therefore, comparing to many systems without intelligent control of read-ahead cache, example implementations can improve the efficiency of utilizing read-ahead cache. Also, example implementations do not override optimizations for random reading operations.

The present disclosure thus includes, without limitation, the following example implementations.

Some example implementations provide a method of intelligent control of read-ahead cache for a client application. The method comprises: receiving an application profile of the client application, the application profile indicating thresholds for determining a plurality of access patterns of the client application; determining a current access pattern of the client application based on the thresholds and a historical access pattern of the client application, wherein the current access pattern and the historical access pattern are one of the plurality of access patterns; and in response thereto, dynamically enabling and disabling read-ahead cache for the client application based on a transition between the historical access pattern and the current access pattern.

In some example implementations of the method of any preceding example implementation, or any combination of preceding example implementations, the plurality of access patterns includes a sequential access pattern, a random access pattern and a random-incremental access pattern.

In some example implementations of the method of any preceding example implementation, or any combination of preceding example implementations, the historical access pattern is a random access pattern or a random-incremental access pattern and the current access pattern is a sequential access pattern. Dynamically enabling and disabling read-ahead cache for the client application includes enabling read-ahead cache for the client application having the current access pattern.

In some example implementations of the method of any preceding example implementation, or any combination of preceding example implementations, the historical access pattern is a sequential access pattern and the current access pattern is a random access pattern or a random-incremental access pattern. Dynamically enabling and disabling read-ahead cache for the client application includes disabling read-ahead cache for the client application having the current access pattern.

In some example implementations of the method of any preceding example implementation, or any combination of preceding example implementations, the historical access pattern is a random access pattern and the current access pattern is a random-incremental access pattern. Dynamically enabling and disabling read-ahead cache for the client application includes enabling read-ahead cache for the client application having the current access pattern when a jump of read offsets for reading operations of the client application is below a value.

In some example implementations of the method of any preceding example implementation, or any combination of preceding example implementations, one or more of the thresholds are dynamically adjustable during reading operations of the client application.

In some example implementations of the method of any preceding example implementation, or any combination of preceding example implementations, determining the current access pattern of the client application includes determining the current access pattern of the client application based on a specified number of previous reading operations of the client application and the thresholds.

Some example implementations provide an apparatus for intelligent control of read-ahead cache for a client application. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for intelligent control of read-ahead cache for a client application. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that summary above is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
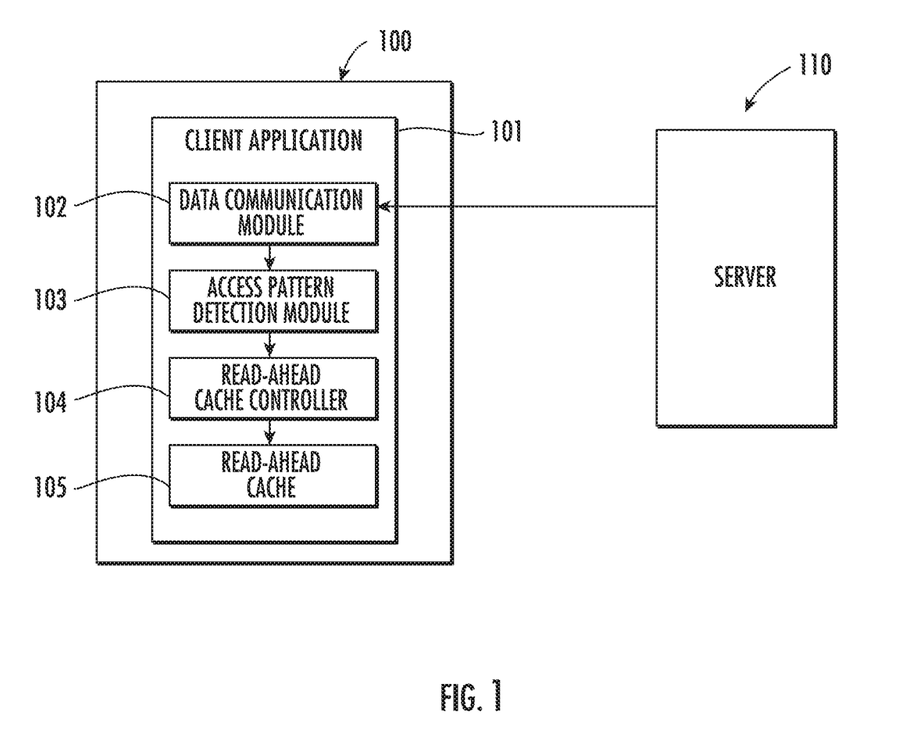
FIG. 1 illustrates a system for intelligent control of read-ahead cache for a client application, according to example implementations of the present disclosure.

FIG. 1 illustrates a system 100 for intelligent control of read-ahead cache for a client application 101, according to example implementations of the present disclosure. The system may be a client device. In some examples, as described in greater detail with reference to FIG. 4, the system may be implemented by an apparatus that includes a processor and a memory storing executable instructions.

As shown, in some implementations, the system 100 includes the client application 101. The client application may be software implemented in the system. In some implementations, the client application may include any of a number of different subsystems (each an individual system) for performing one or more functions or operations. As shown, in some examples, the client application includes one or more of each of a data communication module 102, an access pattern detection module 103, read-ahead cache controller 104 and read-ahead cache 105. The subsystems may be co-located or directly coupled to one another, or in some examples, various ones of the subsystems may communicate with one another across one or more computer networks. Further, although shown as part of the system, it should be understood that any one or more of the data communication module, access pattern detection module, read-ahead cache controller or read-ahead cache may function or operate as a separate system without regard to any of the other subsystems. It should also be understood that the system may include one or more additional or alternative subsystems than those shown in FIG. 1. In one implementation, the system may be deployed in a cloud environment.

In some implementations, the data communication module 102 is configured to receive an application profile of the client application 101. The application profile indicates thresholds for determining a plurality of access patterns of the client application. The application profile may be stored in a server 110. Thus, in one example, the data communication module 102 can receive the application profile from the server. The application profile maybe stored in the client application. Thus, in another example, the data communication module 102 can receive the application profile from the client application. In some implementations, the plurality of access patterns includes a sequential access pattern, a random access pattern and a random-incremental access pattern. The plurality of access patterns will be described with greater details with reference to FIGS. 2A, 2B and 2C below.

In some implementations, one or more of the above thresholds are dynamically adjustable during reading operations of the client application 101. For example, the client application may restore a virtual machine (VM) that may result in random access patterns during the initial restoration. This may be due to the fact that a VM is being booted from a backup. Once the VM is booted up, the restoration via the VM may have sequential access patterns. Thus, in this example, the thresholds may be adjusted to favor random reading operations during initial VM boot up and may be adjusted dynamically to favor sequential reading operations during post VM boot up.

The data communication module 102 may provide information such as the thresholds in the application profile to the access pattern detection module 103. In some implementations, the access pattern detection module 103 is configured to determine a current access pattern of the client application 101 based on the thresholds and a historical access pattern of the client application. The current access pattern and the historical access pattern are one of the plurality of access patterns. The historical access pattern may be a previous or earlier access pattern of the client application. In some implementations, the access pattern detection module is configured to determine the current access pattern of the client application based on a specified number of previous reading operations of the client application and the thresholds. For example, if at least 90% (the threshold) of the previous 20 reading operations are sequential reading operations, the access pattern detection module can determine that the current access pattern of the client application is a sequential access pattern.

The access pattern detection module 103 may provide the detected current access pattern to the read-ahead cache controller 104. In some implementations, in response to the detected current access pattern of the client application 101, the read-ahead cache controller is configured to dynamically enabling and disabling read-ahead cache 105 for the client application based on a transition between the historical access pattern and the current access pattern. The read-ahead cache may store data or metadata pre-fetched from the server 110.

In some implementations, the historical access pattern is a random access pattern or a random-incremental access pattern and the current access pattern is a sequential access pattern. In these implementations, the read-ahead cache controller 104 is configured to enable read-ahead cache 105 for the client application 101 having the current access pattern. That is, when the access pattern of the client application is transitioned from a random access pattern or a random-incremental access pattern to a sequential access pattern, the read-ahead cache controller can enable read-ahead cache for the client application to read data or metadata from the read-ahead cache.

In some implementations, the historical access pattern is a sequential access pattern and the current access pattern is a random access pattern or a random-incremental access pattern. In these implementations, the read-ahead cache controller 104 is configured to disable read-ahead cache 105 for the client application 101 having the current access pattern. That is, when the access pattern of the client application is transitioned from a sequential access pattern to a random access pattern or a random-incremental access pattern, the read-ahead cache controller can disable read-ahead cache for the client application to avoid reading data or metadata from the read-ahead cache.

In some implementations, the historical access pattern is a random access pattern and the current access pattern is a random-incremental access pattern. In these implementations, the read-ahead cache controller 104 is configured to enable read-ahead cache 105 for the client application 101 having the current access pattern when a jump of read offsets for reading operations of the client application is below a value. That is, when the access pattern of the client application is transitioned from a random access pattern to a random-incremental access pattern, the random-incremental access pattern can be considered as a sequential access pattern when one or more jumps of read offsets for reading operations of the client application are below a value, e.g., below 64 kilobytes (KB) for data or below 4 megabytes (MB) for metadata. Thus, the read-ahead cache controller can enable read-ahead cache for the client application to read data or metadata from the read-ahead cache.

In some implementations, the historical access pattern is a sequential access pattern and the current access pattern is a random-incremental access pattern. In these implementations, the read-ahead cache controller 104 can keep the read-ahead cache enabled for the client application 101 having the current access pattern when a jump of read offsets for reading operations of the client application is below a value. That is, when the access pattern of the client application is transitioned from a sequential access pattern to a random-incremental access pattern, the random-incremental access pattern can be considered as a continued sequential access pattern when one or more jumps of read offsets for reading operations of the client application are below a value.

Figure 2A:
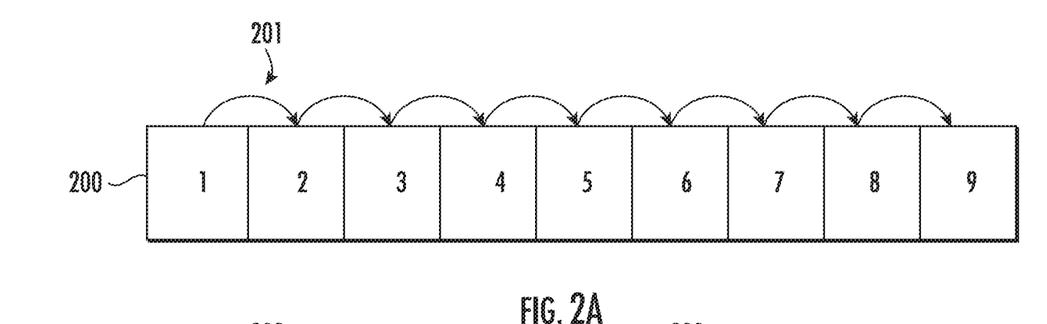
FIGS. 2A, 2B and 2C illustrate different access patterns, according to example implementations.
Figure 2B:
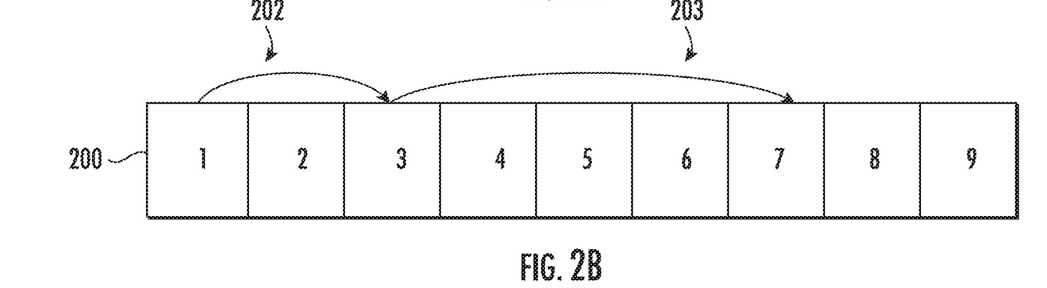
Figure 2C:
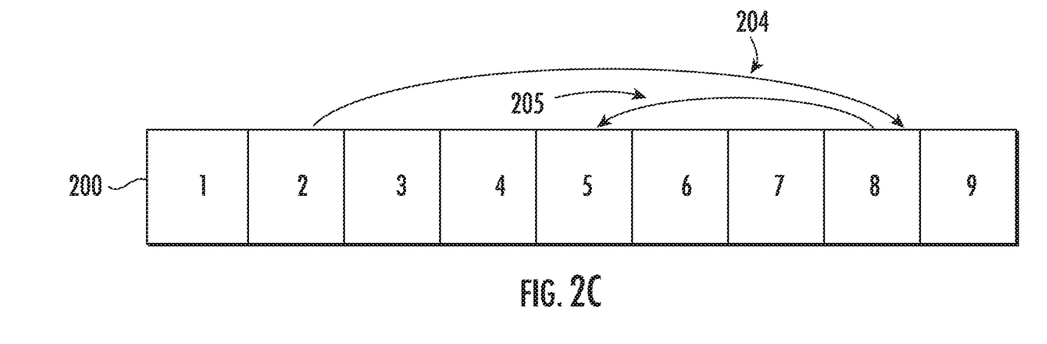

FIGS. 2A, 2B and 2C illustrate different access patterns, according to example implementations of the present disclosure. FIG. 2A illustrates a sequential access pattern, according to example implementations of the present disclosure. As shown in FIG. 2A, a file 200 may include multiple data blocks such as data block 1 to data block 9. The client application 101 may perform reading operations to the file. With a sequential access pattern, in one example, the reading operations may start from accessing data block 1, and then access data block 2, as indicated by arrow 201. With a sequential access pattern, the reading operations may access data blocks 1-9 sequentially. That is, with a sequential access pattern, the reading operations can access contiguous data blocks one by one in a sequence.

FIG. 2B illustrates a random-incremental access pattern, according to example implementations of the present disclosure. Similarly as above, as shown in FIG. 2B, the file 200 may include multiple data blocks such as data block 1 to data block 9. The client application 101 may perform reading operations to the file. With a random-incremental access pattern, in one example, the reading operations may start from accessing data block 1, and then jump to access data block 3, as indicated by arrow 202. In this example, the jump of read offsets for reading operations of the client application is 2 data blocks. In another example, after accessing access data block 3, the reading operations may jump to access data block 7, as indicated by arrow 203. In this example, the jump of read offsets for reading operations of the client application is 4 data blocks. In other examples, the jump of read offsets may be other values, e.g., 64 kilobytes (KB) for data or 4 megabytes (MB) for metadata. That is, with a random-incremental access pattern, the reading operations can access data blocks in an incremental or increasing order of read offsets, e.g., from data block 1 to data block 3 and from data block 3 to data block 7.

FIG. 2C illustrates a random pattern, according to example implementations of the present disclosure. Similarly as above, as shown in FIG. 2C, the file 200 may include multiple data blocks such as data block 1 to data block 9. The client application 101 may perform reading operations to the file. With a random access pattern, in one example, the reading operations may start from accessing data block 2, and then jump to access data block 8, as indicated by arrow 204. In another example, after accessing access data block 8, the reading operations may jump back to access data block 5, as indicated by arrow 205. That is, with a random access pattern, the reading operations can access data blocks randomly. Also, with a random access pattern, the reading operations may access data blocks in a non-incremental order of read offsets.

In some examples, the access pattern detection module 103 can implement an access pattern detection algorithm to determine the access pattern of the client application 101. In one example, for each region within a file where a sequential access needs to be detected, an access pattern file context may be allocated and initialized. Size of each region of the file may be fixed or dynamically set based on jumps in read offsets. In each access pattern file context, the access pattern detection algorithm may track most recent N reading operations or inputs/outputs (I/Os), where N may be determined based on workload or may be set to a specific value (e.g., N=20).

In one example, a reading operation may be considered as a sequential access if it is adjacent or within a value from the previous reading operation. As explained above, the value may be 64 kilobytes (KB) for data or 4 megabytes (MB) for metadata. If one reading operation is sequential to the previous reading operation, it may not indicate a sequential access pattern. In one example, if a minimum percentage (a threshold) of reading operations is sequential to previous reading operations, the access pattern detection module 103 can determine that the current access pattern is a sequential access pattern. For example, if at least 90% (the threshold) of the previous 20 reading operations are sequential reading operations, the access pattern detection module 103 can determine that the current access pattern of the client application is a sequential access pattern. In another example, the access pattern detection module 103 can assume a sequential access pattern for the first N reading operations. In one example, a default access pattern may be assumed to be a sequential access pattern and the read-ahead cache 105 may be enabled as a default.

In one example, there may be four operations in the context of access pattern detection. The first operation may be initialization of access pattern file context, which may be performed via an application programming interface (API) as described below:

```
void
   apd_file_ctx_init(INOUT apd_file_ctx_t *apd_ctx,
      IN dd_off_t seq_threshold,
      IN dd_uint32_t max_io_regions,
      IN dd_uint32_t access_seq_threshold,
      IN dd_uint32_t access_rand_threshold,
      IN dd_uint32_t access_rand_inc_threshold,
      IN size_t file_size);
```

In the initialization of access pattern file context, an access pattern file data structure may be returned via the API. And a data structure for each region of the access pattern file context may be defined. In one example, in each reading operation, the read offset and length of the reading operation may be read. The read offset may be compared to one or more read offsets of historical reading operations to determine whether one or more thresholds are exceeded.

In one example, the second operation may be getting current access pattern for a region within a file, which may be performed via an API as described below:

```
dd_access_pattern_type_t
apd_get_current_access_pattern(IN apd_file_ctx_t *access_pattern_ctx,
    IN dd_off_t f_off,
    IN dd_off_t len,
    OUT dd_uint32_t *seq_frequency);
```

In one example, the access pattern detection module 103 can determine the current access pattern of the client application 101 based on the thresholds and a historical access pattern of the client application. For example, if at least 90% (the threshold) of the previous 20 reading operations are sequential reading operations, the access pattern detection module can determine that the current access pattern of the client application is a sequential access pattern.

In one example, the third operation may be comparing current access pattern against thresholds and historical access pattern, which may be performed via an API as described below:

```
dd_access_pattern_type_t
apd_detect_access_pattern(INOUT apd_file_ctx_t *access_pattern_ctx,
    IN dd_off_t f_off,
    IN dd_off_t len,
    INOUT dd_uint32_t);
```

In one example, the access pattern detection module 103 can determine a transition between the historical access pattern and the current access pattern. For example, if the historical access pattern is a sequential access pattern and if it is determined that the threshold for random access pattern is satisfied or exceeded (e.g., 70% of the previous 20 reading operations are random reading operations), then the access pattern of the client application 101 is transitioned from a sequential access pattern to a random access pattern. And the read-ahead cache controller 104 can disable read-ahead cache 105 for the client application, as described above.

In one example, the fourth operation may be de-initialization of access pattern context, which may be performed via an API as described below:

apd_file_ctx_deinit(INOUT apd_file_ctx_t *apd_ctx);

In one example, after the de-initialization of access pattern context, the access pattern file context may be destroyed when the file closes. In another example, a user of the client application 101 may choose to manually disable read-ahead cache despite that the read-ahead cache controller 104 determines to enable the read-ahead cache. That is, the decision of the read-ahead cache controller may be bypassed by the user.

The thresholds for different access patterns may be different. In one example, the thresholds for determining a plurality of access patterns of the client application 101 may be set to constant values in the initialization of access pattern file context. In another example, the thresholds may be controlled via specific system parameters. In a further example, as described above, one or more of the thresholds are dynamically adjustable during reading operations of the client application. For example, a virtual machine (VM) may restore data that may result in random access patterns during the initial restoration. This may be due to the fact that a VM is being booted from a backup. Once the VM is booted up, the restoration via the VM may have sequential access patterns. Thus, in this example, the thresholds may be adjusted to favor random reading operations during initial VM boot up and may be adjusted dynamically to favor sequential reading operations during post VM boot up. In one example, the threshold favoring random reading operations may be that only if 95% of last 20 reading operations are sequential, the access pattern can be determined as a sequential access pattern; otherwise, it is a random access pattern. Similar threshold can be set to favor sequential reading operations.

In one example, the thresholds may be stored or set in one or more application profiles of the client application 101 stored in the server 110. The application profiles may allow fine tuning of the thresholds on a per application or per workload basis. The user or the client application may set the application profiles on either directories or on individual files. Values in the individual file level application profiles may override the directory application profiles. In one example, the application profiles may be disabled by default and may be enabled for intelligent control of read-ahead cache.

In one example, the application profiles may contain a set of threshold values. For example, a specific set of 7 threshold values can make up an application profile. These application profiles may be stored in a persistent storage and an internal API may be used to get the names of the application profiles. The persistent storage may be in the server 110 or the client application 101. As described above, the data communication module 102 can receive an application profile of the client application 101 from the server 110.

Figure 3:
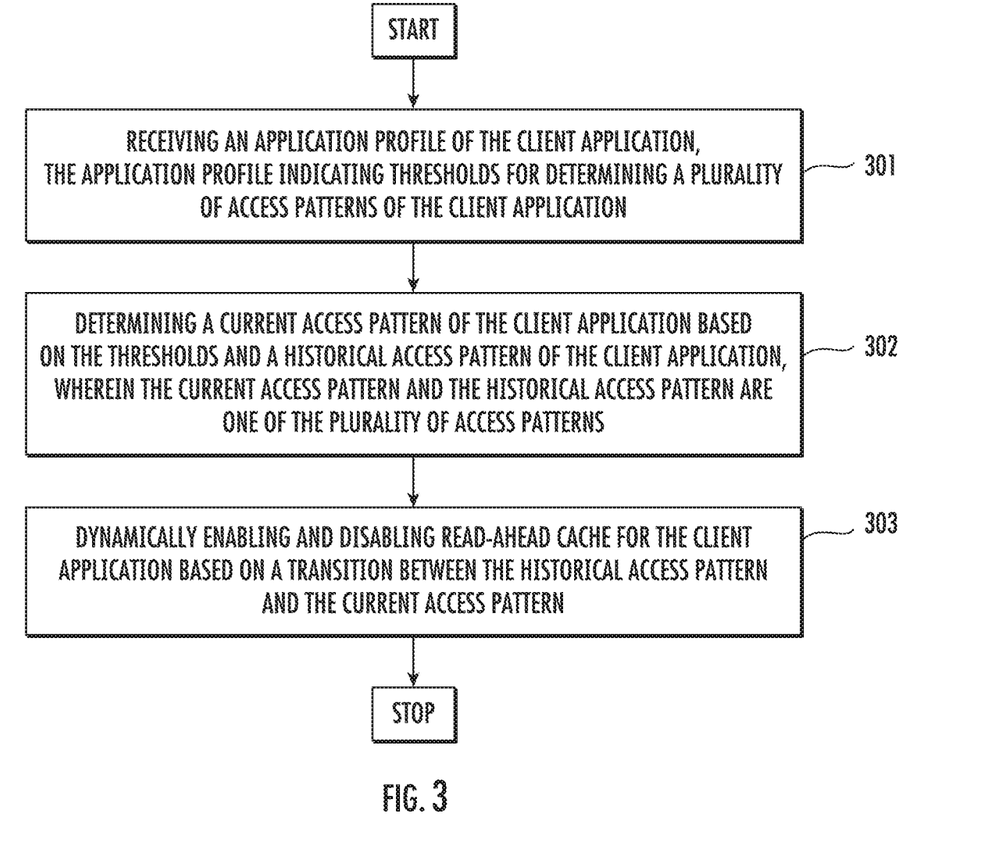
FIG. 3 is a flowchart illustrating various operations in a method of intelligent control of read-ahead cache for a client application, according to various example implementations.

FIG. 3 is a flowchart illustrating various operations in a method 300 of intelligent control of read-ahead cache for a client application, according to various example implementations of the present disclosure. At block 301, the method includes receiving an application profile of the client application 101. The application profile indicates thresholds for determining a plurality of access patterns of the client application. At block 302, the method includes determining a current access pattern of the client application based on the thresholds and a historical access pattern of the client application. The current access pattern and the historical access pattern are one of the plurality of access patterns. In response to the current access pattern determined, the method at block 303 includes dynamically enabling and disabling read-ahead cache 105 for the client application based on a transition between the historical access pattern and the current access pattern.

According to example implementations of the present disclosure, the system 100, the client application 101 and its subsystems including the data communication module 102, access pattern detection module 103, read-ahead cache controller 104 and read-ahead cache 105 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
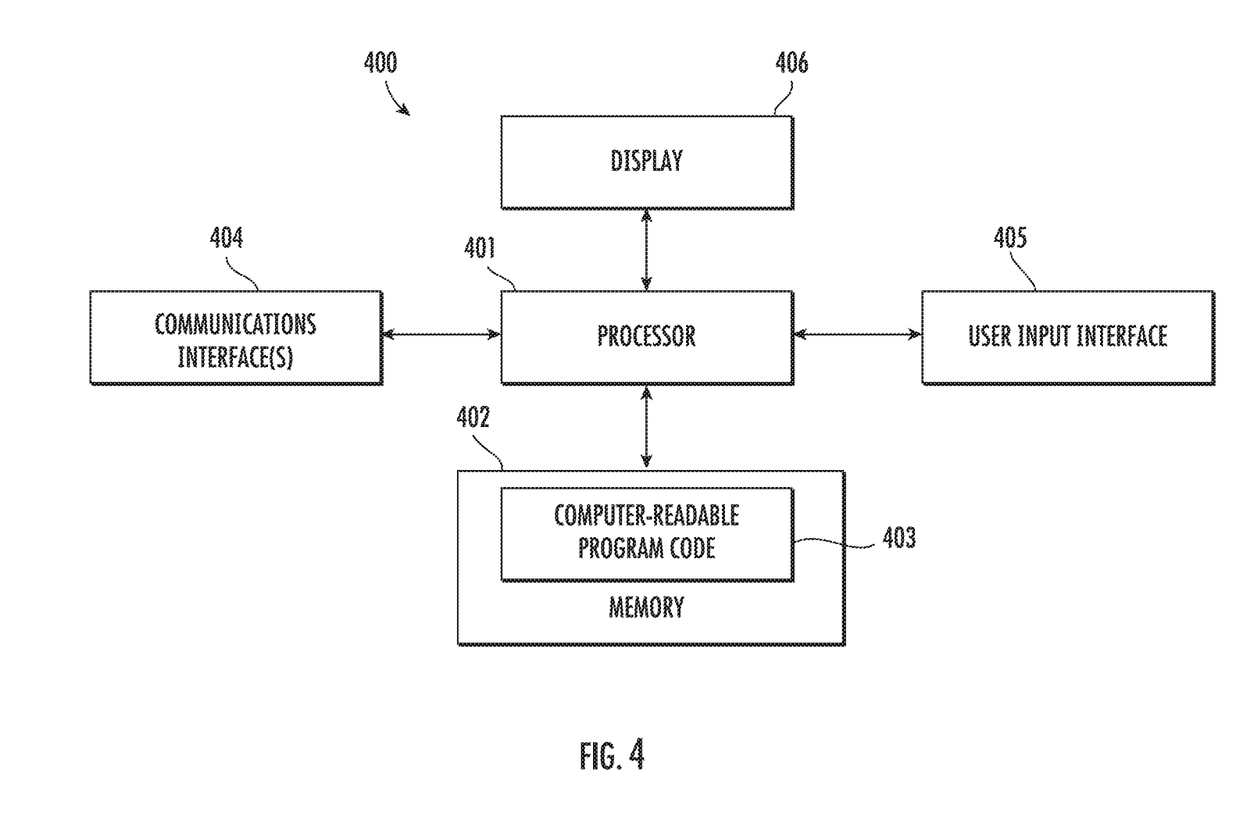
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 401 (e.g., processing circuitry) connected to a memory 402 (e.g., storage device). In some examples, the apparatus 400 implements the system 100.

The processor 401 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 402 (of the same or another apparatus).

The processor 401 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 402 is generally any piece of computer hardware that is capable of storing information such as, for example, data, computer programs (e.g., computer-readable program code 403) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 402, the processor 401 may also be connected to one or more interfaces for displaying, transmitting and/or receiving information. The interfaces may include a communications interface 404 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 406 and/or one or more user input interfaces 405 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 401 and a computer-readable storage medium or memory 402 coupled to the processor, where the processor is configured to execute computer-readable program code 403 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of dynamically enabling or dynamically disabling read-ahead cache for a client application, the method comprising:

receiving an application profile of the client application from a server, the application profile indicating thresholds for determining a plurality of access patterns of the read ahead cache for the client application, each of the plurality of access patterns having a different threshold, wherein the application profile adjusts the thresholds on a per application or per workload basis, wherein the application profile is configured on a directory or on an individual file level, the thresholds in the individual file level application profiles overriding the directory level application profile;

determining a current access pattern of the client application based on the thresholds and a historical access pattern of the client application, wherein the current access pattern and the historical access pattern are one of the plurality of access patterns, wherein the determining the current access pattern of the client application includes initializing, via an application programming interface (API), an access pattern file context for each region within a file, the API returning an access pattern file data structure to thereby define a data structure for each region of the access pattern file context, comparing the current access pattern against the thresholds and the historical access pattern, de-initializing the access pattern file context when one or more of the thresholds are exceeded, and destroying the access pattern file context after the de-initializing of the access pattern file context; and in response thereto, dynamically enabling or dynamically disabling the read-ahead cache for the client application based on a transition between the historical access pattern and the current access pattern.

2. The method of claim 1, wherein the plurality of access patterns includes a sequential access pattern, a random access pattern and a random-incremental access pattern.

3. The method of claim 2, wherein the historical access pattern is a random access pattern or a random-incremental access pattern and the current access pattern is a sequential access pattern, and wherein dynamically enabling and disabling read-ahead cache for the client application includes enabling read-ahead cache for the client application having the current access pattern.

4. The method of claim 2, wherein the historical access pattern is a sequential access pattern and the current access pattern is a random access pattern or a random-incremental access pattern, and wherein dynamically enabling and disabling read-ahead cache for the client application includes disabling read-ahead cache for the client application having the current access pattern.

5. The method of claim 2, wherein the historical access pattern is a random access pattern and the current access pattern is a random-incremental access pattern, and wherein dynamically enabling and disabling read-ahead cache for the client application includes enabling read-ahead cache for the client application having the current access pattern when a jump of read offsets for reading operations of the client application is below a value.

6. The method of claim 1, wherein one or more of the thresholds are dynamically adjustable during reading operations of the client application.

7. The method of claim 1, wherein determining the current access pattern of the client application includes determining the current access pattern of the client application based on a specified number of previous reading operations of the client application and the thresholds.

8. An apparatus for dynamically enabling or dynamically disabling read-ahead cache for a client application, the apparatus comprising a processor and a memory storing executable instructions that, in response to execution by the processor, cause the apparatus to:

receive an application profile of the client application from a server, the application profile indicating thresholds for determining a plurality of access patterns of the read-ahead cache for the client application, each of the plurality of access patterns having a different threshold, wherein the application profile adjusts the thresholds on a per application or per workload basis, wherein the application profile is configured on a directory or on an individual file level, the thresholds in the individual file level application profiles overriding the directory level application profile;

determine a current access pattern of the client application based on the thresholds and a historical access pattern of the client application, wherein the current access pattern and the historical access pattern are one of the plurality of access patterns, wherein to determine the current access pattern of the client application includes
initialize, via an application programming interface (API), an access pattern file context for each region within a file, the API returning an access pattern file data structure to thereby define a data structure for each region of the access pattern file context,
compare the current access pattern against the thresholds and the historical access pattern,
de-initialize the access pattern file context when one or more of the thresholds are exceeded, and
destroy the access pattern file context after the de-initializing of the access pattern file context; and in response thereto, dynamically enable or dynamically disable the read-ahead cache for the client application based on a transition between the historical access pattern and the current access pattern.

9. The apparatus of claim 8, wherein the plurality of access patterns includes a sequential access pattern, a random access pattern and a random-incremental access pattern.

10. The apparatus of claim 9, wherein the historical access pattern is a random access pattern or a random-incremental access pattern and the current access pattern is a sequential access pattern, and wherein the apparatus being caused to dynamically enable and disable read-ahead cache for the client application includes being caused to enable read-ahead cache for the client application having the current access pattern.

11. The apparatus of claim 9, wherein the historical access pattern is a sequential access pattern and the current access pattern is a random access pattern or a random-incremental access pattern, and wherein the apparatus being caused to dynamically enable and disable read-ahead cache for the client application includes being caused to disable read-ahead cache for the client application having the current access pattern.

12. The apparatus of claim 9, wherein the historical access pattern is a random access pattern and the current access pattern is a random-incremental access pattern, and wherein the apparatus being caused to dynamically enable and disable read-ahead cache for the client application includes being caused to enable read-ahead cache for the client application having the current access pattern when a jump of read offsets for reading operations of the client application is below a value.

13. The apparatus of claim 8, wherein one or more of the thresholds are dynamically adjustable during reading operations of the client application.

14. The apparatus of claim 8, wherein the apparatus being caused to determine the current access pattern of the client application includes being caused to determine the current access pattern of the client application based on a specified number of previous reading operations of the client application and the thresholds.

15. A computer-readable storage medium for dynamically enabling or dynamically disabling read-ahead cache for a client application, the computer-readable storage medium being non-transitory and having computer-readable program code stored therein that in response to execution by a processor, causes an apparatus to:

receive an application profile of the client application from a server, the application profile indicating thresholds for determining a plurality of access patterns of the read-ahead cache for the client application, each of the plurality of access patterns having a different threshold, wherein the application profile adjusts the thresholds on a per application or per workload basis, wherein the application profile is configured on a directory or on an individual file level, the thresholds in the individual file level application profiles overriding the directory level application profile;

determine a current access pattern of the client application based on the thresholds and a historical access pattern of the client application, wherein the current access pattern and the historical access pattern are one of the plurality of access patterns, wherein to determine the current access pattern of the client application includes
initialize, via an application programming interface (API), an access pattern file context for each region within a file, the API returning an access pattern file data structure to thereby define a data structure for each region of the access pattern file context,
compare the current access pattern against the thresholds and the historical access pattern,
de-initialize the access pattern file context when one or more of the thresholds are exceeded, and
destroy the access pattern file context after the de-initializing of the access pattern file context; and in response thereto, dynamically enable or dynamically disable the read-ahead cache for the client application based on a transition between the historical access pattern and the current access pattern.

16. The computer-readable storage medium of claim 15, wherein the plurality of access patterns includes a sequential access pattern, a random access pattern and a random-incremental access pattern.

17. The computer-readable storage medium of claim 16, wherein the historical access pattern is a random access pattern or a random-incremental access pattern and the current access pattern is a sequential access pattern, and wherein the apparatus being caused to dynamically enable and disable read-ahead cache for the client application includes being caused to enable read-ahead cache for the client application having the current access pattern.

18. The computer-readable storage medium of claim 16, wherein the historical access pattern is a sequential access pattern and the current access pattern is a random access pattern or a random-incremental access pattern, and wherein the apparatus being caused to dynamically enable and disable read-ahead cache for the client application includes being caused to disable read-ahead cache for the client application having the current access pattern.

19. The computer-readable storage medium of claim 16, wherein the historical access pattern is a random access pattern and the current access pattern is a random-incremental access pattern, and wherein the apparatus being caused to dynamically enable and disable read-ahead cache for the client application includes being caused to enable read-ahead cache for the client application having the current access pattern when a jump of read offsets for reading operations of the client application is below a value.

20. The computer-readable storage medium of claim 15, wherein the apparatus being caused to determine the current access pattern of the client application includes being caused to determine the current access pattern of the client application based on a specified number of previous reading operations of the client application and the thresholds.

\* \* \* \* \*